Patented Oct. 7, 1952

2,613,157

UNITED STATES PATENT OFFICE 2,613,157

POLYMERIC PLASTICIZERS

Hogan B. Knight, Philadelphia, Pa., assignor to the United States of America as represented by the Secretary of Agriculture No Drawing. Application January 13, 1950, Serial No. 138,530

15 Claims. (Cl. 106—179)

(Granted under the act of March 3, 1883, as amended April 30, 1928; 370 O. G. 757)

The invention herein described may be manufactured and used by or for the Government of the United States of America for governmental purposes throughout the world, without the payment to me of any royalty thereon.

This invention relates to condensation products of 9,10-dihydroxystearic acid esters with phthalic acid or anhydride. An object of the invention is to provide new compositions of matter and methods for their preparation and use as plasticizers. Other objects and advantages will be apparent from the following description of the invention.

I have found that the esters of low and high melting 9,10-dihydroxystearic acid can be condensed with phthalic acid or anhydride to form polymeric condensation products, which are odorless, non-volatile, stable, water-insoluble substances that are compatible with, and advantageously modify the properties of many commercial polymers.

The polymeric plasticizing agents of this invention are obtained by heating an ester of 9,10-dihydroxystearic acid with phthalic anhydride or phthalic acid, preferably in substantially equimolecular proportions, at a temperature and for a length of time sufficient to convert reaction mixture to an essentially homogeneous product which displays, while maintained at this reaction temperature, the property of threading. This property is one of forming a continuous filament of considerable length and pliability when the surface of the reaction mixture is touched with a glass rod, for example, and the rod is then drawn away.

In general, at the beginning of the reaction it is desirable to use temperatures above 200° C., and preferably in the neighborhood of 215°–218° C. Thereafter, in order to obtain a homogeneous reaction mixture it is desirable to increase the temperature and maintain it at about 235°–240° C. until the formation of the polymeric condensation product is substantially completed.

The esters of 9,10-dihydroxystearic acid suitable for use in the process of this invention include the alkyl esters such as methyl, ethyl, butyl and other lower alkyl esters of low and high melting 9,10-dihydroxystearic acid containing from 1 to 18 carbon atoms in the alkyl radical; esters of low and high melting 9,10-dihydroxystearic acid with ether-alcohols, such as the alkyl or benzyl monoethers of ethylene glycol or alkyl monoethers of diethylene glycol, and other esters of low and high melting 9,10-dihydroxystearic acid described by Knight and Swern in their application for patent, Serial No. 138,529, filed January 13, 1950.

The following Examples I through IV illustrate the preparation of the polymeric condensation products.

EXAMPLE I 63 g. of methyl 9,10-dihydroxystearate, M. P. 69°–70° C., and 29.6 g. of phthalic anhydride were heated at 215°–218° C. for one hour and then at 235°–240° C. until the reaction product showed signs of threading. At this point about 93% of the phthalic anhydride had reacted and the product was a pale yellow viscous liquid.

EXAMPLE II 10 g. of 9,10-dihydroxystearate of ethylene glycol monobenzyl ether were heated with 3.3 g. of phthalic anhydride as described in Example I. The product was a pale yellow viscous liquid.

EXAMPLE III 8 g. of 9,10-dihydroxystearate of ethylene glycol monobutyl ether and 3 g. of phthalic anhydride were heated as described in the foregoing examples until the reaction product was threading. The product so obtained was a pale yellow viscous liquid.

EXAMPLE IV 8 g. of 9,10-dihydroxystearate of diethylene glycol monomethyl ether and 3 g. of phthalic anhydride were heated as described in Example I until the product was threading. The product thus obtained was an amber-colored, viscous liquid.

Since both reactants are bifunctional there is no danger of gelation occurring under the conditions described in the foregoing examples. However if the free di-hydroxystearic acid is employed instead of its esters the reaction product gels readily and the process requires extremely close control. Furthermore the dihydroxystearic acid-phthalic anhydride reaction product, undergoes crystallization just prior to the gel point, which is often a disadvantage in a plasticizer, since a low melting point may be necessary for permanent compatibility.

The polymerization reaction between the phthalic anhydride and the dihydroxystearic acid ester can be continued until a larger proportion of the phthalic anhydride than that indicated in the examples has undergone reaction. This procedure, however, yields products of higher viscosity and increased molecular weight which are less compatible with other polymeric materials. Unreacted phthalic anhydride can be removed by heating under vacuum, by solvent extraction, or by esterification with a lower alcohol.

The following results illustrate the use of the products of this invention as plasticizers. In each case the phthalic anhydride 9,10-dihydroxystearic acid ester condensation product was dissolved in about 20 ml. of a stock solution of polymer, and the resulting solution spread on to a 6″ x 8″ glass plate. The solvent was allowed to evaporate slowly and the residual film, after removal from the plate, was examined for compatibility of plasticizer, and by comparison with a similar film containing no plasticizing agent, it was determined whether the flexibility of the film had been improved by an addition of the condensation product of phthalic anhydride with an ester of 9,10-dihydroxystearic acid.

Some of the results so obtained are tabulated as follows:

1. Ethyl cellulose stock solution:
Ethyl cellulose_____g__ 16
Xylene:butanol (80:20 by volume)_____ml__ 200

| Polymeric Plasticizer | Percent by Weight of Dry Film | Results |
| --- | --- | --- |
| Each of the products of Examples I to IV. | 20 | Compatible:flexible films. |

2. Polyvinyl chloride-acetate stock solution:
Polyvinyl chloride—polyvinyl acetate copolymer (95:5)
_____g__ 16
Butyl Acetate:Tetrahydropyran (80:20 by volume)
_____ml__ 250

| Polymeric Plasticizer | Percent by Weight of Dry Film | Results |
| --- | --- | --- |
| Each of the products of Examples I and IV. | 30 | Compatible:stiff films. |

3. Polyvinyl butyral stock solution:
Polyvinyl butyral (high or low viscosity)_____g__ 16
Toluene:ethanol (80:20 by volume)_____ml__ 200

| Polymeric Plasticizer | Percent by Weight of Dry Film | Results |
| --- | --- | --- |
| Each of the products of Examples I and IV. | 30 | Compatible:flexible films. |

As disclosed in said Knight and Swern application, the esters employed in the examples above are prepared by heating a solution of the 9,10-dihydroxystearic acid in benzene or toluene with the glycol monoether in the presence of an acidic esterification catalyst, such as a naphthalene sulfonic acid, and azeotropically removing the water formed in the esterification process from the reaction mixture. This process is continued until the stoichiometric amount of water has been recovered, after which the ester is isolated by washing the reaction mixture with water and evaporating the organic solvent. The residue so obtained consists of the ester of the 9,10-dihydroxystearic acid. Other inert organic solvents forming water-containing azeotropes may be used in place of benzene or toluene and any acidic esterification catalyst can be used in lieu of the naphthalene sulfonic acid. Usually it is advantageous to utilize an excess of monoether in the process in order to accelerate the esterification rate and to minimize side reactions such as polymerization between the hydroxyl and carboxyl groups of the dihydroxystearic acids.

The following examples are taken from the Knight and Swern application:

(A) A mixture of 15.8 g. 9,10-dihydroxystearic acid, M. P. 95° C., 7.6 g. of ethylene glycol monomethyl ether, 0.79 g. of naphthalene-2-sulfonic acid and 200 ml. of toluene was refluxed for eight hours. The water formed during the reaction was removed azeotropically with the toluene and the toluene was returned to the reaction mixture. The reaction mixture was then evaporated to dryness, and the residue washed three times with hot water. The washed product consisting essentially of the low-melting isomer, 9,10-dihydroxystearic acid ester of ethylene glycol methyl ether was obtained in quantitative yield and melted at 44.5°–47° C. Recrystallization from acetone yielded the substantially pure ester M. P. 52.3°–53.0° C.; saponification number, 153 (theory 150).

(B) The high melting isomer, 9,10-dihydroxystearic acid ester of ethylene glycol methyl ether M. P. 80.5°–84.9° C. was prepared as described in (A), using 9,10-dihydroxystearic acid M. P. 130° C., in place of the low-melting isomer. The substantially pure ester, M. P. 89° C. saponification number 152 was obtained by recrystallization from acetone.

(C) The low-melting isomer 9,10-dihydroxystearic acid ester of ethylene glycol butyl ether was prepared by the procedure of (A), using 15.8 g. 9,10-dihydroxystearic acid, M. P. 95° C., 11.8 g. ethylene glycol monobutyl ether, 0.79 g. naphthalene-2-sulfonic acid and 200 ml. toluene. Recrystallization from acetone yielded the substantially pure ester M. P. 52°–53° C., saponification number 136 (theory 135).

(D) The high melting isomer 9,10-dihydroxystearic acid ester of ethylene glycol butyl ether was prepared as in (C) using 9,10-dihydroxystearic acid M. P. 130° C. Recrystallization from acetone yielded the substantially pure ester, M. P. 82° C., saponification number 138 (theory 135).

(E) The low melting isomer 9,10-dihydroxystearic acid ester of ethylene glycol benzyl ether was prepared by the procedure of (A), using 31.6 g. 9,10-dihydroxystearic acid M. P. 95° C., 30.4 g. ethylene glycol monobenzyl ether, 1.6 g. naphthalene-2-sulfonic acid and 400 ml. toluene. Recrystallization from acetone yielded the substantially pure ester M. P. 47° C.

(F) The high melting isomer 9,10-dihydroxystearic acid ester of ethylene glycol benzyl ether was prepared as in (E) using 9,10-dihydroxystearic acid M. P. 130° C. Recrystallization from acetone yielded the substantially pure ester, M. P. 81° C.

(G) The low melting isomer 9,10-dihydroxystearic acid ester of diethylene glycol methyl ether was prepared by the procedure of (A), using 31.6 g. 9,10-dihydroxystearic acid, M. P. 95° C., 24 g. diethylene glycol monomethyl ether, 1.6 g. naphthalene-2-sulfonic acid and 400 ml. toluene. Recrystallization from acetone yielded the substantially pure ester, M. P. 41.6° C., saponification number 139 (theory 134).

(H) The high-melting isomer 9,10-dihydroxystearic acid ester of diethylene glycol methyl ether was prepared as in (G), using 9,10-dihydroxystearic acid M. P. 130° C. Recrystallization from acetone yielded the substantially pure ester, M. P. 83° C., saponification number 138 (theory 134).

Having thus described my invention, I claim:

1. A process which comprises heating at condensation temperature approximately equimolecular proportions of phthalic acid anhydride and a monomeric ester of 9,10-dihydroxystearic acid, and continuing such heating until the major portion of the phthalic acid anhydride has been converted to a condensation polymer formed by interaction with said ester, the ester being of the formula X—COOR in which X—CO— is the acyl radical of 9,10-dihydroxystearic acid and R is a radical of the group consisting of alkyl hydrocarbon radicals and the radicals —CH₂CH₂OR' and —CH₂CH₂OCH₂—CH₂R'' in which R' is a member of the group consisting of alkyl, phenyl, and benzyl hydrocarbon radicals and R'' is an alkyl hydrocarbon radical.

2. A composition of matter comprising a condensation polymer of approximately equimolecular proportions of phthalic acid anhydride and a monomeric ester of 9,10-dihydroxystearic acid, the ester being of the formula X—COOR in which X—CO— is the acyl radical of 9,10-dihydroxystearic acid and R is a radical of the group consisting of alkyl hydrocarbon radicals and the radicals —CH₂CH₂OR' and

—CH₂CH₂OCH₂—CH₂R'' is a member of the group consisting of alkyl, phenyl, and benzyl hydrocarbon radicals and R'' is an alkyl hydrocarbon radical.

3. The process of claim 1 wherein the condensation is conducted at a temperature within the range of 200°–250° C.

4. The process of claim 1 wherein the ester of 9,10-dihydroxystearic acid is a lower alkyl ester.

5. The process of claim 1 wherein the ester of 9,10-dihydroxystearic acid is an ester of an ethylene glycol monoether.

6. The process of claim 1 wherein the ester of 9,10-dihydroxystearic acid is an ester of a diethylene glycol monoalkyl ether.

7. The composition of matter defined in claim 2 wherein the hydrocarbon ester of 9,10-dihydroxystearic acid is an alkyl ester.

8. The composition of matter defined in claim 2 wherein the ester of 9,10-dihydroxystearic acid is an ester of an ethylene glycol monoether.

9. The composition of matter defined in claim 2 wherein the ester of 9,10-dihydroxystearic acid is an ester of a diethylene glycol monoalkyl ether.

10. The composition of claim 2 wherein the ester is the methyl ester of 9,10-dihydroxystearic acid.

11. The composition of claim 2 wherein the ester is the 9,10-dihydroxystearate of ethylene glycol monobutyl ether.

12. The composition of claim 2 wherein the ester is the 9,10-dihydroxystearate of diethylene glycol monomethyl ether.

13. The composition of claim 2 wherein the ester is the 9,10-dihydroxystearate of ethylene glycol monobenzyl ether.

14. A plasticizer for synthetic resins, the plasticizer being a condensation polymer of approximately equimolecular proportions of phthalic acid anhydride and a monomeric ester of 9,10-dihydroxystearic acid with a compound of the group consisting of mono-hydric lower alkanols and glycol mono ethers.

15. A plasticized synthetic resin, the plasticizer being a condensation polymer of approximately equimolecular proportions of phthalic acid anhydride and a monomeric ester of 9,10-dihydroxystearic acid with a compound of the group consisting of mono-hydric lower alkanols and glycol mono ethers.

HOGAN B. KNIGHT.

REFERENCES CITED

The following references are of record in the file of this patent:

UNITED STATES PATENTS

| Number | Name | Date |
|---|---|---|
| 1,815,886 | Bruson | July 21, 1931 |
| 2,396,129 | Rodman | Mar. 5, 1946 |